(12) United States Patent
Pang

(10) Patent No.: US 9,074,494 B2
(45) Date of Patent: Jul. 7, 2015

(54) SYSTEM AND APPARATUS FOR CONTROLLING TEMPERATURE IN A HEAT RECOVERY STEAM GENERATOR

(75) Inventor: Raymond Pang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 13/278,917

(22) Filed: Oct. 21, 2011

(65) Prior Publication Data

US 2013/0098313 A1   Apr. 25, 2013

(51) Int. Cl.
| | |
|---|---|
| F02C 6/00 | (2006.01) |
| F02C 6/18 | (2006.01) |
| F01K 23/10 | (2006.01) |
| F22G 5/04 | (2006.01) |

(52) U.S. Cl.
CPC ............... *F01K 23/108* (2013.01); *F02C 6/18* (2013.01); *F22G 5/04* (2013.01); *Y02E 20/16* (2013.01)

(58) Field of Classification Search
USPC .......................................................... 122/460
See application file for complete search history.

(56) References Cited

U.S. PATENT DOCUMENTS

| | | | | |
|---|---|---|---|---|
| 3,796,045 A | * | 3/1974 | Foster-Pegg | 60/772 |
| 4,241,701 A | * | 12/1980 | Morse | 122/460 |
| 4,353,207 A | * | 10/1982 | Lee | 60/39.182 |
| 4,706,612 A | * | 11/1987 | Moreno et al. | 122/7 R |
| 5,279,356 A | * | 1/1994 | Bruhn | 165/47 |
| 5,365,730 A | * | 11/1994 | Bruckner et al. | 60/39.182 |
| 5,628,179 A | * | 5/1997 | Tomlinson | 60/783 |
| 5,881,558 A | * | 3/1999 | Kawahara et al. | 62/408 |
| 6,125,623 A | * | 10/2000 | Cloyd et al. | 60/783 |
| 6,584,776 B2 | * | 7/2003 | Mittricker et al. | 60/775 |
| 6,748,733 B2 | * | 6/2004 | Tamaro | 60/39.182 |
| 7,168,233 B1 | * | 1/2007 | Smith et al. | 60/39.182 |
| 7,337,752 B2 | * | 3/2008 | Boros et al. | 122/15.1 |
| 8,127,795 B2 | * | 3/2012 | Buttell et al. | 137/875 |
| 2004/0172951 A1 | * | 9/2004 | Hannemann et al. | 60/776 |
| 2010/0064655 A1 | | 3/2010 | Zhang et al. | |

FOREIGN PATENT DOCUMENTS

| | | |
|---|---|---|
| DE | 4434526 C1 | 4/1996 |
| EP | 0309792 A1 | 4/1989 |
| EP | 0609037 A2 | 8/1994 |
| EP | 1331366 A2 | 7/2003 |
| GB | 2082084 A * | 3/1982 |
| JP | H0861012 A | 3/1996 |
| WO | 9205344 A1 | 4/1992 |
| WO | WO 92/05344 * | 4/1992 |

OTHER PUBLICATIONS

Search Report from FR Application No. 1259974 dated Oct. 10, 2013.

* cited by examiner

*Primary Examiner* — Steven B McAllister
*Assistant Examiner* — Rabeeul Zuberi
(74) *Attorney, Agent, or Firm* — Fletcher Yoder P.C.

(57) ABSTRACT

A system that controls temperature in a heat recovery steam generator (HRSG). One heat recovery steam generator system may include a first exhaust path. The heat recovery steam generator system also may include a second exhaust path. The heat recovery steam generator system may include a first damper configured to selectively allow a portion of an exhaust to flow through the second exhaust path.

11 Claims, 4 Drawing Sheets

SYSTEM AND APPARATUS FOR CONTROLLING TEMPERATURE IN A HEAT RECOVERY STEAM GENERATOR

BACKGROUND OF THE INVENTION

The subject matter disclosed herein relates generally to heat recovery steam generator systems and, more specifically, to controlling temperature in a heat recovery steam generator (HRSG) system.

An HRSG may use gas turbine engine exhaust to heat a fluid flowing through heat exchangers in the HRSG. In some configurations, the fluid may be steam used for high-pressure, intermediate-pressure, and/or low-pressure sections of a steam turbine. Under certain conditions, such as when operating the gas turbine engine with a partial load or when operating at relatively high ambient temperatures, the fluid temperature in the heat exchangers may exceed designed temperature boundaries. Therefore, the HRSG may attempt to control fluid temperatures flowing through the heat exchangers. The fluid temperatures may be controlled to predetermined levels during operation of the gas turbine engine. Some HRSG systems may control the temperatures within the HRSG by attemperation. For example, such HRSG systems may spray a cool fluid into the heat exchangers to cool the fluid already in the heat exchangers. Such a method may cool the fluid temperature as desired; however, thermal efficiency of the HRSG system is lost due to switching from heating the fluid to cooling the fluid and then heating the fluid again. Consequently, such attemperation methods may result in reduced plant electrical output and efficiency. Accordingly, there is a need for a system and apparatus for controlling temperature in an HRSG system to improve the performance of the HRSG system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a heat recovery steam generator (HRSG) system includes a plurality of heat exchangers, a first exhaust flow path configured to facilitate heat exchange between exhaust from a gas turbine and a first heat exchanger of the plurality of heat exchangers, and a second exhaust flow path configured to route a portion of the exhaust to bypass the first heat exchanger.

In a second embodiment, a control system for a heat recovery steam generator (HRSG) system includes a controller configured to receive a first indication of a first temperature, receive a second indication of a second temperature, and determine which of at least one exhaust flow path from a plurality of exhaust flow paths will be utilized to flow exhaust based on the first and second temperature indications.

In a third embodiment, a heat recovery steam generator (HRSG) system includes a first exhaust path, a second exhaust path, and a first damper configured to selectively allow a portion of an exhaust to flow through the second exhaust path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
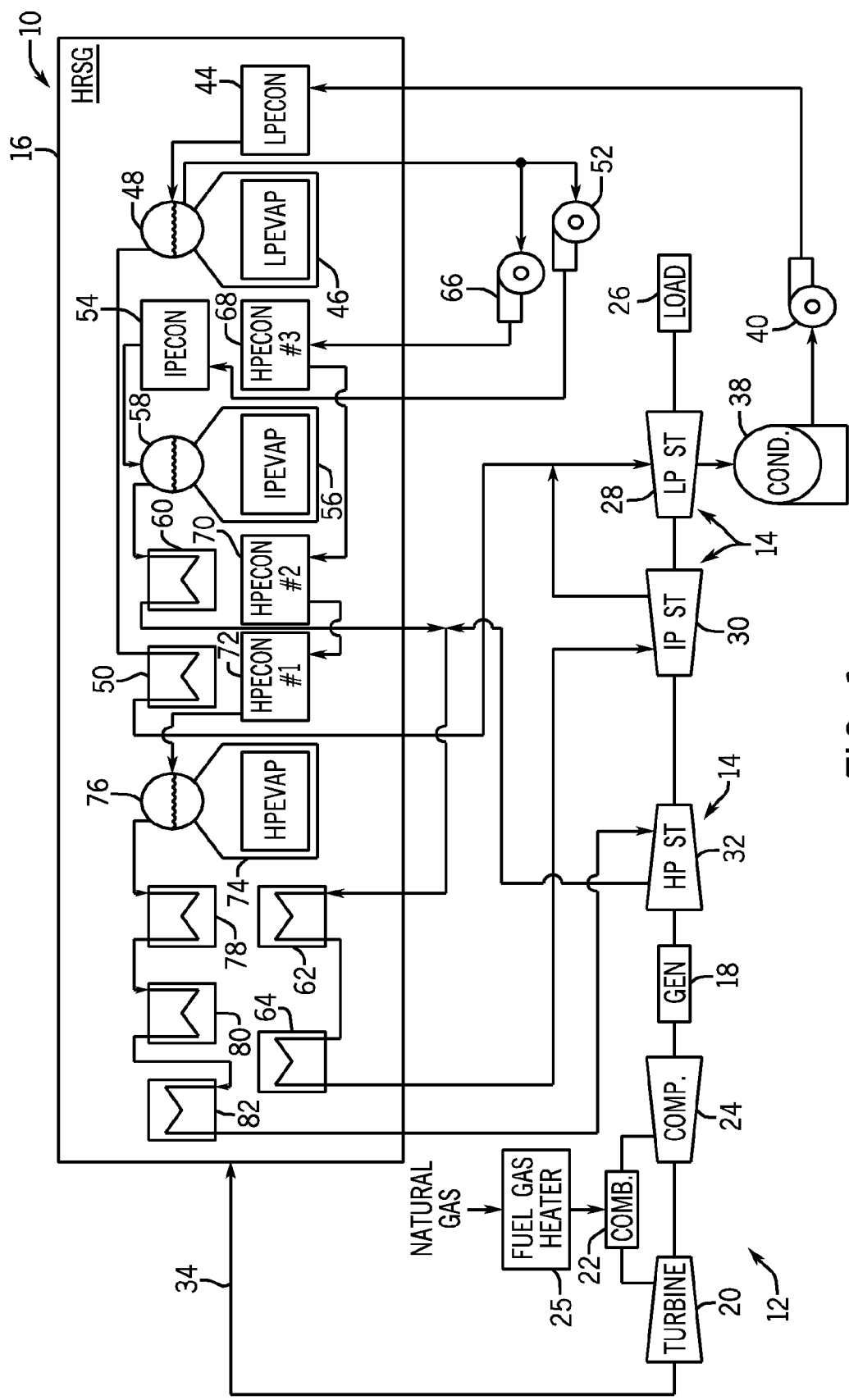
FIG. 1 is a schematic diagram of an embodiment of a power plant, having an HRSG system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, certain embodiments of a heat recovery steam generator (HRSG) system include a first exhaust flow path that facilitates heat exchange between exhaust from a gas turbine and a first heat exchanger. To control the temperature of the fluid flowing through the first heat exchanger, the HRSG system includes a second exhaust flow path that may be used to bypass the first heat exchanger. For example, fluid may flow through the first exhaust flow path and the second exhaust flow path when less heat is needed for heating fluid in the first heat exchanger. Controlling the temperature of the fluid in the first heat exchanger in such a manner may increase performance of the HRSG system.

In one embodiment, there may be a third exhaust flow path that may be used to cause additional exhaust to bypass the first heat exchanger and/or bypass a second heat exchanger. For example, the third exhaust flow path may be arranged in parallel with the second exhaust flow path so that exhaust flowing through the second and third exhaust flow paths will bypass the first heat exchanger. Additionally and/or alternatively, the third exhaust flow path may be arranged in series with the second exhaust flow path so that exhaust flowing through the second flow path bypasses the first heat exchanger and exhaust flowing through the third flow path bypasses the second heat exchanger. Further, dampers may be used to selectively enable exhaust to flow into the second and third flow paths. The dampers may be placed in various positions (e.g., open, closed, or a position in-between) to control the amount of exhaust flowing into the second and third flow paths.

In another embodiment, an actuation system may move the one or more dampers based on feedback from a control system. For example, when sensor measurements pass a certain threshold, the dampers may open or close to enable or inhibit exhaust from flowing through the second and third flow paths. Additionally, a controller may be utilized to control the temperature of the fluid flowing through the first heat exchanger. For example, the controller may receive signals from one or more sensors that indicate temperatures within the HRSG system. These signals may be utilized by the controller to determine which flow paths to be used for the exhaust flow.

Turning now to the drawings and referring first to FIG. 1, FIG. 1 is a schematic flow diagram of an embodiment of a combined cycle power generation system 10 having a gas turbine 12, a steam turbine 14, and an HRSG system 16. The system 10 may include the gas turbine 12 for driving a generator 18 (e.g., a load). The generator 18 may, for instance, be an electrical generator for producing electrical power. Further, the gas turbine 12 may include a turbine 20, a combustor or combustion chamber 22, and a compressor 24. In certain embodiments, the combustion chamber 22 may receive natural gas and/or liquid fuel from a fuel gas heater 25 coupled to the combustion chamber 22. In one embodiment, the system 10 may also include the steam turbine 14 for driving a load 26. The load 26 may also be an electrical generator for generating electrical power. However, both the generator 18 and the load 26 may be other types of loads capable of being driven by the gas turbine 12 and steam turbine 14. In addition, although the gas turbine 12 and steam turbine 14 appear to be utilized in tandem to drive the generator 18 and the load 26 together on a single shaft, as shown in the illustrated embodiment, the gas turbine 12 and steam turbine 14 may also be used to drive the generator 18 and the load 26 on separate shafts. However, the specific configuration of the steam turbine 14, as well as the gas turbine 12, may be implementation-specific and may include any combination of sections.

The system 10 may also include the multi-stage HRSG 16. The components of the HRSG 16, in the illustrated embodiment, are a simplified depiction of the HRSG 16 and are not intended to limit what may be included in the HRSG 16. Rather, the illustrated HRSG 16 is shown to convey the general operation of HRSG systems. Further, the HRSG 16 may be provided as a single stage HRSG 16 or as any other type of HRSG. Heated exhaust gas 34 from the gas turbine 12 may be transported into the HRSG 16 and used to heat steam for use in powering the steam turbine 14. As may be appreciated, the temperature of the exhaust gas 34 may vary based on a number of variables including fuel composition, ambient conditions, and/or the operating conditions of the gas turbine 12. For example, the temperature of the exhaust gas 34 may vary within a range of approximately 300 to 400° C. during typical operation.

In combined cycle systems such as system 10, hot exhaust gas 34 may flow from the gas turbine 12 and pass through the HRSG 16 and may be used to generate steam at one or more pressure levels and at high temperatures. The steam produced by the HRSG 16 may then be passed through the steam turbine 14 for power generation. In addition, the produced steam may be supplied to any other processes where superheated/saturated steam may be used. The gas turbine 12 cycle is often referred to as the "topping cycle," or Brayton cycle, whereas the steam turbine 14 generation cycle (e.g., steam cycle) is often referred to as the "bottoming cycle" or Rankine cycle. By combining these two cycles as illustrated in FIG. 1, the combined cycle power generation system 10 may lead to greater overall efficiency for the combined plant. In particular, exhaust heat from the topping cycle may be captured and used to generate steam for use in the bottoming cycle.

In the illustrated embodiment, the steam turbine 14 may include a low-pressure section 28 (LP ST), an intermediate-pressure section 30 (IP ST), and a high-pressure section 32 (HP ST). As may be appreciated, each of the pressure sections 28, 30, and 32 may produce exhaust. Exhaust from the low-pressure section 28 of the steam turbine 14 may be directed into a condenser 38, where the exhaust is condensed into a liquid condensate. The condensate from the condenser 38 may, in turn, be directed toward the low-pressure section of the HRSG 16 with the aid of a condensate pump 40. Further, the condensate may then flow through a low-pressure economizer 44 (LPECON), which is used to heat the condensate. From the low-pressure economizer 44, the condensate may be directed into a low-pressure evaporator 46 (LPEVAP) having a pressure vessel 48 (e.g., boiler) used to produce steam from the condensate. Steam produced from the low-pressure evaporator 46 may flow through a low-pressure superheater 50, where the steam is superheated and then directed to the low-pressure section 28 of the steam turbine 14.

Returning to the pressure vessel 48, heated condensate may be pumped from the pressure vessel 48 through an intermediate-pressure pump 52 toward an intermediate-pressure economizer 54 (IPECON) for applying addition heat to the condensate. From the intermediate-pressure economizer 54, the condensate may be directed into an intermediate-pressure evaporator 56 (IPEVAP) having a pressure vessel 58 (e.g., boiler) used to produce steam from the condensate. Steam from the intermediate-pressure evaporator 56 may be directed to an intermediate-pressure superheater 60, where the steam is superheated. The superheated steam may then flow through a primary re-heater 62 and a secondary re-heater 64 before being directed to the intermediate-pressure section 30 of the steam turbine 14. As illustrated, exhaust from the intermediate-pressure section 30 of the steam turbine 14 may be directed into the low-pressure section 28 of the steam turbine 14.

Returning again to the pressure vessel 48, heated condensate may be pumped from the pressure vessel 48 through a high-pressure pump 66 toward a third high-pressure economizer 68 (HPECON #3) for applying additional heat to the condensate. Condensate from the third high-pressure economizer 68 may be directed to a second high-pressure economizer 70 (HPECON #2) then to a first high-pressure economizer 72 (HPECON #1) where the condensate is further heated. Condensate from the first high-pressure economizer 72 may be directed into a high-pressure evaporator 74 (HPEVAP) having a pressure vessel 76 (e.g., boiler) used to produce steam from the condensate. Steam exiting the high-pressure evaporator 74 may be directed into a primary high-pressure superheater 78, a secondary high-pressure superheater 80, and a finishing high-pressure superheater 82, where the steam is superheated and eventually sent to the high-pressure section 32 of the steam turbine 14. As illustrated, exhaust from the high-pressure section 32 of the steam turbine 14 may, in turn, be directed through the primary and secondary re-heaters 62 and 64 and into the intermediate-pressure section 30 of the steam turbine 14.

During operation of the system 10, the fluid flowing through the various heat exchangers (e.g., economizers 44, 54, 68, 70, and 72, superheaters 50, 60, 78, 80, and 82, and re-heaters 62 and 64) may exceed a desired temperature. For example, during startup of the steam turbine 14 while the gas turbine 12 is in operation, it may be desirable to control the fluid flowing through the various heat exchangers to a predetermined temperature of approximately 300 to 400° C. Further, in certain modes of operation, it may be desirable to control the fluid flowing through the various heat exchangers to a temperature less than approximately 500 to 700° C. at all times during operation of the gas turbine 12. Therefore, the HRSG 16 may be arranged so that exhaust 34 may bypass certain heat exchangers and that the exhaust 34 heats the fluid in the heat exchangers when it is desired. Various embodiments of bypass exhaust flow paths are described in FIGS. 2 and 3.

Figure 2:
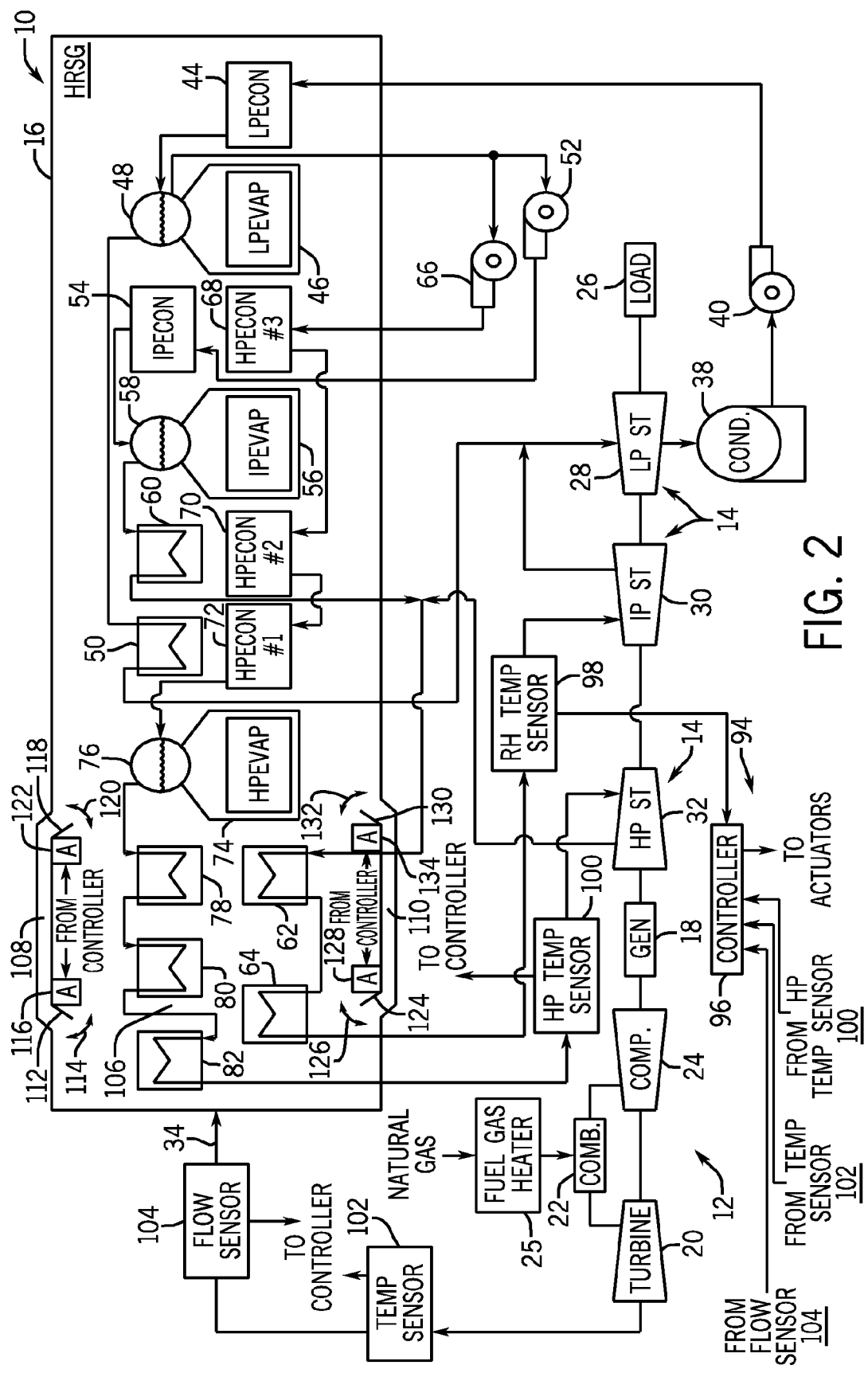
FIG. 2 is a schematic diagram of an embodiment of the power plant of FIG. 1, having an HRSG system with two exhaust bypass flow paths.

FIG. 2 is a schematic diagram of an embodiment of the power plant 10 of FIG. 1, having an HRSG system 16 with two exhaust bypass flow paths. The exhaust bypass flow paths are used to direct a portion of the exhaust 34 away from a main exhaust flow path. Moreover, as illustrated, the power plant 10 includes a control system 94 for controlling the flow of exhaust 34 through the exhaust flow paths (e.g., bypass and main exhaust flow paths). The control system 94 includes a controller 96 that sends and receives control signals for communicating with devices such as sensors and actuators. As may be appreciated, the controller 96 may include one or more processors for executing instructions stored on a storage device, such as a memory. The controller 96 may control the flow path for exhaust 34 to flow through the HRSG 16 by enabling exhaust to bypass at least one heat exchanger in the HRSG 16. Various sensors are connected to the controller 96 for providing indications to the controller 96. In particular, a re-heater temperature sensor 98 (e.g., thermocouple) is coupled to a flow path between the secondary re-heater 64 and the intermediate-pressure section 30. The re-heater temperature sensor 98 measures a temperature of the fluid exiting the secondary re-heater 64 and provides an indication of the measured temperature to the controller 96. Further, a high-pressure temperature sensor 100 (e.g., thermocouple) is coupled to a flow path between the finishing high-pressure superheater 82 and the high-pressure section 32. The high-pressure temperature sensor 100 measures a temperature of the fluid exiting the finishing high-pressure superheater 82 and provides an indication of the measured temperature to the controller 96. In addition, an exhaust gas temperature sensor 102 (e.g., thermocouple) is coupled to a flow path between the gas turbine 12 and the HRSG 16. The exhaust gas temperature sensor 102 measures a temperature of the fluid exiting the gas turbine 12 and provides an indication of the measured temperature to the controller 96. An exhaust gas flow sensor 104 is coupled between the gas turbine 12 and the HRSG 16. The exhaust gas flow sensor 104 measures a quantity of exhaust flowing from the gas turbine 12 to the HRSG 16 and provides an indication of the measured exhaust flow to the controller 96. As may be appreciated, the gas flow sensor 104 may be any suitable type of flow sensor or meter.

In general, the exhaust 34 entering the HRSG 16 flows through a main exhaust flow path 106 which is located generally in a central region and along the length of the HRSG 16. The main exhaust flow path 106 facilitates heat exchange between exhaust 34 from the gas turbine 12 and one or more heat exchangers (e.g., economizers 44, 54, 68, 70, and 72, superheaters 50, 60, 78, 80, and 82, and re-heaters 62 and 64). The exhaust 34 may also be directed into a first exhaust bypass flow path 108 and/or a second exhaust bypass flow path 110 so that a portion of the exhaust bypasses one or more heat exchangers (e.g., superheaters 78, 80, and 82, and re-heaters 62 and 64). In some embodiments, approximately 0 to 25%, 5 to 35%, or 20 to 40% of the exhaust 34 entering the HRSG 16 may flow through each of the exhaust bypass flow paths 108 and 110. It should be noted that, in such an embodiment, if both exhaust bypass flow paths 108 and 110 are opened to allow exhaust 34 to flow through them, approximately twice as much of the exhaust 34 entering the HRSG 16 may flow through the exhaust bypass flow paths 108 and 110 (e.g., approximately 0 to 50%, 10 to 70%, or 40 to 80% of the exhaust 34 entering the HRSG 16 may flow through the combination of the exhaust bypass flow paths 108 and 110). As may be appreciated, exhaust 34 may be directed to flow through the first exhaust bypass flow path 108 using an inflow damper 112 (e.g., a door). The inflow damper 112 may open and close access to the first exhaust bypass flow path 108 by moving in one of the directions 114. Further, the inflow damper 112 may be opened and closed using an actuator 116 that is controlled by the controller 96. Additionally, an outflow damper 118 may be used to control the flow of exhaust 34 exiting the first exhaust bypass flow path 108. Again, this outflow damper 118 may open and close by moving in one of the directions 120 after being moved by an actuator 122 controlled by the controller 96.

Similarly, the exhaust 34 may be directed to flow through the second exhaust bypass flow path 110 using an inflow damper 124. The inflow damper 124 may open and close access to the second exhaust bypass flow path 110 by moving in one of the directions 126 after being moved by an actuator 128 controlled by the controller 96. Additionally, an outflow damper 130 may be used to control the flow of exhaust 34 exiting the second exhaust bypass flow path 110. Again, this outflow damper 130 may open and close by moving in one of the directions 132 after being moved by an actuator 134 controlled by the controller 96. As may be appreciated, the dampers 112, 118, 124, and 130 may be moved (e.g., activated) to an open or closed position, or any position in-between (e.g., partially opened). For example, the controller 96 may control the dampers 112, 118, 124, and 130 to be 10 to 50% open, 30 to 95% open, 5 to 60% open, or 0 to 100% open. The particular position of the dampers 112, 118, 124, and 130 may be based on a determination made by the controller 96, such as based on current and/or target temperatures from the temperature sensors 98, 100, and 102. Further, the actuators 116, 122, 128, and 134 may be any type of actuators, such as actuators that are hydraulically, pneumatically, electrically, or mechanically operated.

During operation, the controller 96 may determine which flow path or paths should be utilized to flow exhaust 34 through the HRSG 16. In certain embodiments, the flow path determination may be based on indications from the temperature sensors 98, 100, and/or 102. As may be appreciated, in certain embodiments, there may be a lag between the temperature sensed by the temperature sensors 98, 100, and 102 and the actual temperature at the temperature sensors. For example, because of the lag, the temperature reported by the temperature sensors 98, 100, and 102 may be approximately 10 to 20 seconds late (i.e., the temperature sensors 98, 100, and 102 may take approximately 10 to 20 seconds to measure an accurate temperature). Therefore, when gas turbines 12 having a fast startup are used, the temperature sensors 98, 100, and 102 may provide a temperature that is different from the current temperature. As such, the controller 96 may compensate for the time lag in the temperature sensors 98, 100, and 102. In certain embodiments, the controller 96 may use historic temperatures to estimate the current temperature. For example, in a system with temperature sensors having a 10 second lag, the controller 96 may utilize temperature measurements taken 15 seconds previously and 10 seconds previously to determine a rate of temperature change. Then the rate of temperature change can be used to estimate the current temperature. As may be appreciated, the controller 96 may utilize the temperature sensor 98, 100, and 102 measurements as part of an outer control loop for controlling the dampers 112, 118, 124, and 130 and may provide slow control of the dampers.

After the flow path determination is made, the controller 96 may control the flow paths for exhaust 34 to flow through the determined flow path or paths so that fluid flowing through heat exchangers in the HRSG is not overheated. Thus, the controller 96 may selectively enable exhaust 34 to flow across various heating elements by selectively enabling exhaust flow paths. For example, the controller 96 may determine that less heat is needed to heat the fluid flowing through the heat exchangers. Therefore, the controller 96 may control the dampers 112 and 118 to open, thus enabling exhaust 34 to flow through the first exhaust bypass flow path 108. Conversely, the controller 96 may determine that more heat is needed to heat the fluid flowing through the heat exchangers so that the fluid flowing through the heat exchangers is not under heated. Therefore, the controller 96 may control the dampers 112 and 118 to close, thus inhibiting exhaust 34 from flowing through the first exhaust bypass flow path 108. As may be appreciated, the dampers 124 and 130 may be controlled in a similar manner to the dampers 112 and 118.

As may be appreciated, the first and second exhaust bypass flow paths 108 and 110 may be in a different location than illustrated, such that any of the heat exchangers may be bypassed by either the first or second exhaust bypass flow paths 108 and 110. Further, the first and second exhaust bypass flow paths 108 and 110 may extend a smaller or larger length than illustrated (e.g., the flow paths 108 and 110 may extend along one heat exchanger (e.g., heat exchanger 82) or all heat exchangers (e.g., heat exchangers 50, 60, 62, 64, 78, 80, and 82)). In addition, although only there is only one entrance and one exit for each flow path 108 and 110 illustrated in FIG. 2, in certain embodiments, there may be multiple entrances and one exit, one entrance and multiple exits, or multiple entrances and multiple exits in the flow paths 108 and 110 to control the flow of exhaust 34.

Figure 3:
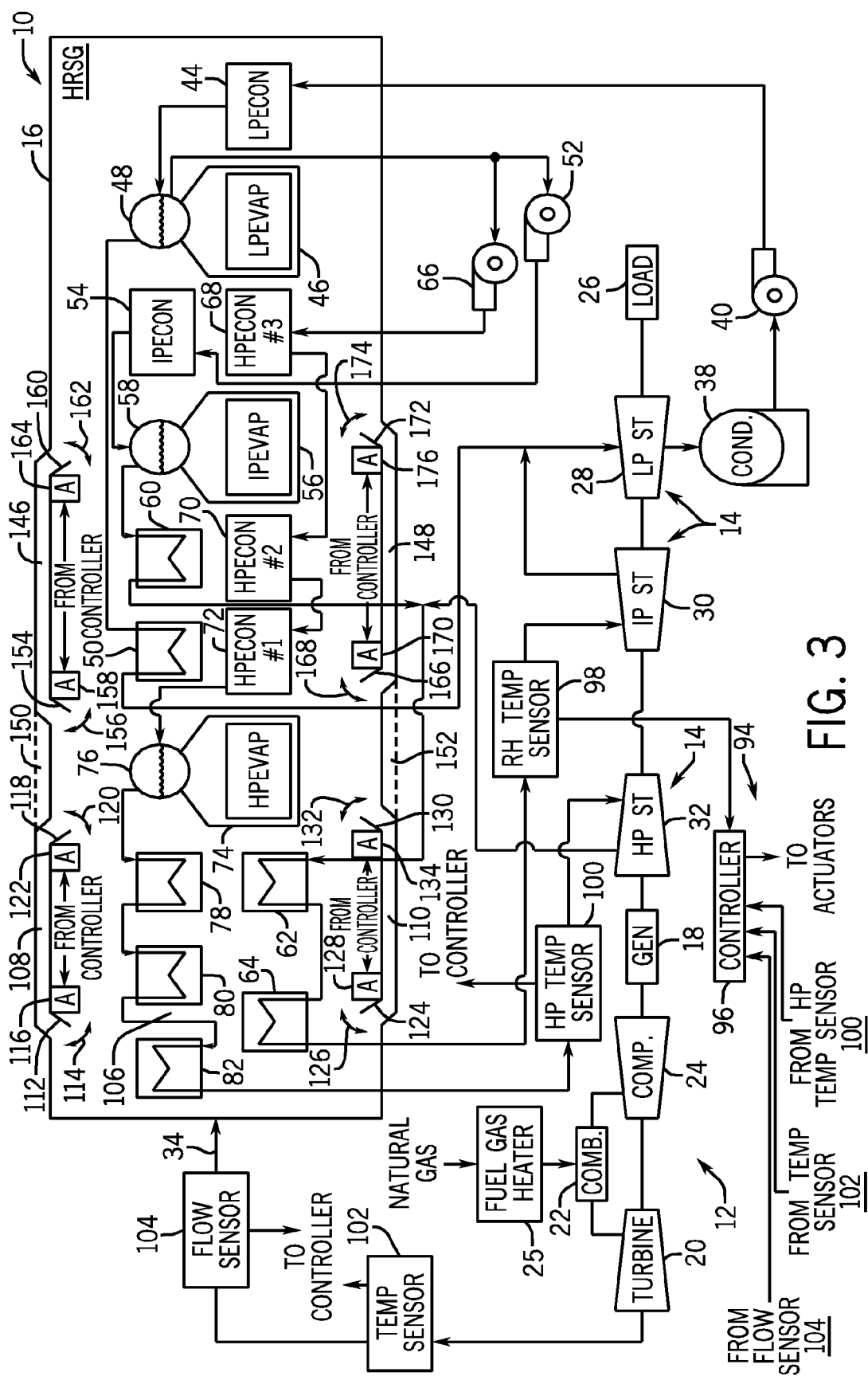
FIG. 3 is a schematic diagram of an embodiment of the power plant of FIG. 2, having an HRSG system with four exhaust bypass flow paths.

FIG. 3 is a schematic diagram of an embodiment of the power plant 10 of FIG. 2, having an HRSG system 16 with four exhaust bypass flow paths. As illustrated, the HRSG 16 may include a third exhaust bypass flow path 146 and a fourth exhaust bypass flow path 148 so that a portion of the exhaust bypasses one or more heat exchangers (e.g., economizers 70, 72, and superheaters 50 and 60). Further, in certain embodiments, the third exhaust bypass flow path 146 may connect to the first exhaust bypass flow path 108 via a first intermediate flow path 150. Likewise, in certain embodiments, the fourth exhaust bypass flow path 148 may connect to the second exhaust bypass flow path 110 via a second intermediate flow path 152.

The exhaust 34 may be directed to flow through the third exhaust bypass flow path 146 using an inflow damper 154. The inflow damper 154 may open and close access to the third exhaust bypass flow path 146 by moving in one of the directions 156 after being moved by an actuator 158 controlled by the controller 96. Additionally, an outflow damper 160 may be used to control the flow of exhaust 34 exiting the third exhaust bypass flow path 146. Again, this outflow damper 160 may open and close by moving in one of the directions 162 after being moved by an actuator 164 controlled by the controller 96.

Similarly, the exhaust 34 may be directed to flow through the fourth exhaust bypass flow path 148 using an inflow damper 166. The inflow damper 166 may open and close access to the fourth exhaust bypass flow path 148 by moving in one of the directions 168 after being moved by an actuator 170 controlled by the controller 96. Additionally, an outflow damper 172 may be used to control the flow of exhaust 34 exiting the fourth exhaust bypass flow path 148. Again, this outflow damper 172 may open and close by moving in one of the directions 174 after being moved by an actuator 176 controlled by the controller 96. As may be appreciated, the dampers 154, 160, 166, and 172 may be moved (e.g., activated) to an open or closed position, or any position in-between. Further, the actuators 158, 164, 170, and 176 may be any type of actuators, such as actuators that are hydraulically, pneumatically, electrically, or mechanically operated. As may be appreciated, the first, second, third, and fourth exhaust bypass flow paths 108, 110, 146, and 148 may be in a different location than illustrated, such that any of the heat exchangers may be bypassed by any of the exhaust bypass flow paths 108, 110, 146, and 148. By using the bypass flow paths 108, 110, 146, and 148, the controller 96 may be able to control the temperature of the fluid flowing through the heat exchangers so that the fluid is not overheated or under heated.

Figure 4:
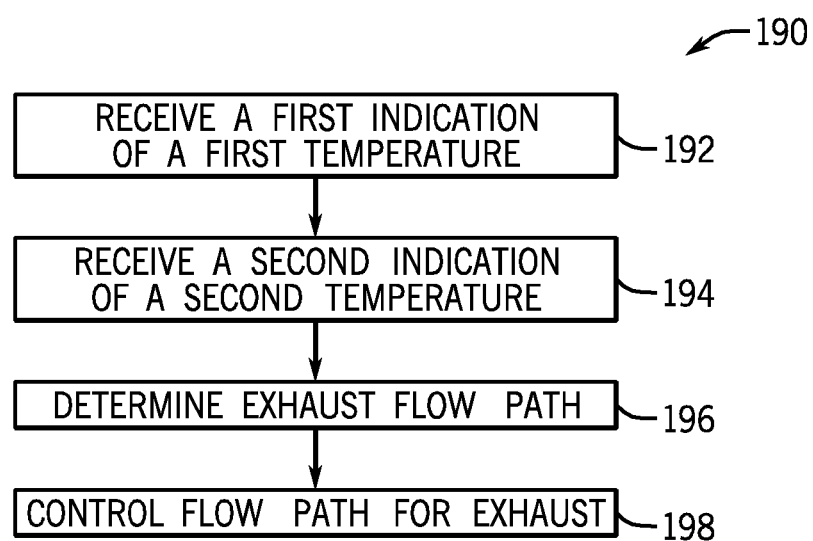
FIG. 4 is a flow chart of an embodiment of a process for controlling the flow of exhaust through an HRSG system.

FIG. 4 is a flow chart of an embodiment of a process 190 for controlling the flow of exhaust through an HRSG system 16. At block 192, the controller 96 may receive a first indication of a first temperature. For example, the controller 96 may receive the first indication of the first temperature from one or more of the temperature sensors 98, 100, and 102. Next, at block 194, the controller 96 may receive a second indication of a second temperature. As may be appreciated, the second indication of the second temperature may be from the same temperature sensor (e.g., the first and second indications may be from sensor 98), or from a different temperature sensor (e.g., the first indication may be from sensor 98 and the second indication may be from sensor 100). For example, the first temperature indication may be measured by the high-pressure temperature sensor 100 approximately 2 minutes after startup of the gas turbine 12. The second temperature indication may be measured by the high-pressure temperature sensor 100 approximately 4 minutes after startup of the gas turbine 12. Based on the two temperature indications, the controller 96 may determine that the fluid flowing to the high-pressure section 32 is increasing too quickly. Then, at block 196, the controller 96 may determine one or more exhaust flow paths for exhaust 34 to flow based on the two indications. Such a determination may be used to control the temperature of fluid flowing through heat exchangers in the HRSG system 16. Further, the determination may be based, at least partly, on the first and second temperature indications. Therefore, the controller 96 may determine that a bypass flow path should be used. At block 198, the controller 96 may control the one or more exhaust flow paths for the exhaust 34 to flow through. For example, the controller 96 may open or close dampers in any of the exhaust bypass flow paths 108, 110, 146, and 148 to control the flow of the exhaust 34.

It should be noted that although certain types of power plants 10 were described in FIGS. 1 through 4, the HRSG 16 with bypass flow paths may be used in any type of power plant 10 or other system. Likewise, there may be fewer, more, or different systems and devices found within the HRSG 16 than what is described and shown. As such, bypass flow paths may be used with any type of HRSG 16 system so that exhaust 34 may bypass the main flow path 106. By using the bypass flow paths, the temperature of fluid flowing through heat exchangers in the HRSG 16 may be controlled (i.e., the amount of hot exhaust 34 flowing across the heat exchangers may be changed as desired). In such a configuration, attemperators are not needed and, therefore, the parts and costs associated with attemperators are not part of the HRSG 16 system. Further, by using the bypass flow paths, the HRSG 16 system may have greater thermal efficiency than systems using attemperators to control the temperature of fluid in the heat exchangers. For example, in certain embodiments, using bypass flow paths may improve the efficiency of the HRSG 16 system by approximately 0.001 to 1.000%.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A heat recovery steam generator (HRSG) system comprising:
    an HRSG comprising:
    a plurality of heat exchangers disposed within the HRSG;
    a first exhaust flow path configured to facilitate heat exchange between exhaust from a gas turbine and a first fluid through a first heat exchanger and a second heat exchanger upstream of the first heat exchanger of the plurality of heat exchangers;
    a second exhaust flow path configured to route a first portion of the exhaust through the second heat exchanger to bypass the first heat exchanger, wherein the first exhaust flow path and the second exhaust flow path are disposed within the HRSG, and the second exhaust flow path is configured to rejoin the first exhaust flow path downstream of the first heat exchanger, wherein the second exhaust flow path is configured to facilitate heat exchange between exhaust from the gas turbine and the first fluid through the second heat exchanger of the plurality of heat exchangers prior to bypass of the first heat exchanger, wherein the bypass of the first heat exchanger comprises a bypass of a first high-pressure superheater, a second high-pressure superheater, and a first re-heater, wherein the first high-pressure superheater is coupled to a high-pressure evaporator and to the second high-pressure superheater, the second high-pressure superheater is coupled to a third high-pressure superheater, and the first re-heater is coupled to a second re-heater and to an intermediate-pressure superheater;
    a third exhaust flow path configured to bypass the intermediate-pressure superheater and a high-pressure economizer, wherein the high-pressure evaporator is coupled to the high-pressure economizer, and the third exhaust flow path is disposed within the HRSG;
    a damper configured to selectively enable the first portion of the exhaust to bypass the first heat exchanger by channeling the first portion of the exhaust through the second exhaust flow path, wherein the damper is disposed within the HRSG; and
    an actuator coupled to the damper, wherein the actuator is configured to control a position of the damper, the position of the damper is configured to control a temperature of the first fluid, and the actuator is disposed within the HRSG.

2. The system of claim 1, comprising a third exhaust flow path configured to route a second portion of the exhaust to bypass the first heat exchanger, wherein the third exhaust flow path is disposed within the HRSG.

3. The system of claim 1, comprising a third exhaust flow path configured to route a second portion of the exhaust to bypass a third heat exchanger, wherein the third exhaust flow path does not route the second portion of the exhaust to bypass the first heat exchanger, and the third exhaust flow path is disposed within the HRSG.

4. The system of claim 1, comprising a third exhaust flow path configured to route a second portion of the exhaust to bypass the first heat exchanger and a third heat exchanger, wherein the third exhaust flow path is disposed within the HRSG.

5. The system of claim 1, comprising an outflow damper configured to selectively enable the first portion of the exhaust from the second exhaust flow path to rejoin the first exhaust flow path downstream of the first heat exchanger.

6. A heat recovery steam generator (HRSG) system comprising:
    an HRSG comprising:
    a plurality of heat exchangers disposed within the HRSG, comprising a first high-pressure superheater, a second high-pressure superheater, a third high-pressure superheater, a first re-heater, a second re-heater, and an intermediate-pressure superheater;
    a first exhaust path disposed within the HRSG, wherein the first exhaust path is configured to flow through the first high-pressure superheater, the second high-pressure superheater, the third high-pressure superheater, the first re-heater, the second re-heater, and the intermediate-pressure superheater;
    a second exhaust path disposed within the HRSG, wherein the second exhaust path is configured to flow through the third high-pressure superheater and to bypass the first high-pressure superheater, the second high-pressure superheater, and the first re-heater, wherein the first high-pressure superheater is coupled to a high-pressure evaporator and to the second high-pressure superheater, the second high-pressure superheater is coupled to the third high-pressure superheater, and the first re-heater is coupled to the second re-heater and to the intermediate-pressure superheater;
    a third exhaust path configured to bypass the intermediate-pressure superheater and a high-pressure economizer, wherein the high-pressure evaporator is coupled to the high-pressure economizer, and the third exhaust path is disposed within the HRSG;
    a first damper configured to selectively allow a portion of an exhaust to flow through the second exhaust path after the second exhaust path flows through at least one of the third high-pressure superheater or the second re-heater, wherein the first damper is disposed within the HRSG and the second exhaust path rejoins the first exhaust path downstream of the first damper; and
    a first actuator coupled to the first damper, wherein the first actuator is configured to control a position of the first damper, and the first actuator is disposed within the HRSG.

7. The system of claim 6, comprising a second damper configured to selectively allow the exhaust to flow through the third exhaust path, wherein the second damper is disposed within the HRSG.

8. The system of claim 6, comprising a controller configured to activate the first damper.

9. The system of claim 6, wherein the first exhaust path is configured to facilitate heat exchange between the exhaust and a fluid through the plurality of heat exchangers, and the first actuator is configured to move the first damper between an open and closed position to control temperature of the fluid, and the fluid comprises steam.

10. The system of claim 1, comprising:
at least one temperature sensor configured to provide a first indication of a first temperature of the first fluid and a second indication of a second temperature of the first fluid; and
a controller configured to control a distribution of the exhaust from the gas turbine among the first exhaust flow path and the second exhaust flow path based at least in part on the first and second temperature indications.

11. The system of claim 8, wherein the controller is configured to receive a first temperature indication and a second temperature indication, and the controller is configured to activate the first damper based at least in part on the first temperature indication and the second temperature indication.

* * * * *